United States Patent
Kuwahara

(10) Patent No.: US 11,560,475 B2
(45) Date of Patent: Jan. 24, 2023

(54) PHOTOCURABLE RESIN COMPOSITION, CURED PRODUCT, AND LAMINATE

(71) Applicant: THREEBOND CO., LTD., Tokyo (JP)

(72) Inventor: Yusuke Kuwahara, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 142 days.

(21) Appl. No.: 17/240,060

(22) Filed: Apr. 26, 2021

(65) Prior Publication Data

US 2021/0347980 A1    Nov. 11, 2021

(30) Foreign Application Priority Data

May 7, 2020 (JP) .............................. JP2020-081963

(51) Int. Cl.
*C08L 51/08* (2006.01)

(52) U.S. Cl.
CPC .................................. *C08L 51/08* (2013.01)

(58) Field of Classification Search
CPC .............. C08F 290/061; C08F 290/062; C08F 290/067; C08L 51/08
See application file for complete search history.

(56) References Cited

U.S. PATENT DOCUMENTS 5,504,133 A * 4/1996 Murouchi ................ C08K 3/22
 252/511
2018/0282445 A1  10/2018 Shibuya et al.

FOREIGN PATENT DOCUMENTS

| JP | 2015-163699 A | 9/2015 |
| WO | 2015079728 A1 | 6/2015 |
| WO | 2019073836 A1 | 4/2019 |

OTHER PUBLICATIONS

EPO, Extended European Search Report for the corresponding European patent application No. 21170262.6, dated Sep. 1, 2021.

* cited by examiner

*Primary Examiner* — Mark S Kaucher
(74) *Attorney, Agent, or Firm* — Lucas & Mercanti, LLP

(57) ABSTRACT

An object of the present invention is to provide a photocurable resin composition capable of obtaining a cured product having excellent quick curability by irradiation with a low integrated light intensity and flexibility.

A photocurable resin composition containing the following components (A) to (E):

component (A): a monofunctional urethane (meth)acrylate having a polyether skeleton;

component (B): a monofunctional (meth)acrylic monomer having a polyether skeleton and having no urethane skeleton;

component (C): a photoradical polymerization initiator;

component (D): a polyfunctional (meth)acrylic monomer having 4 or more functionalities; and component (E): a polyester-based plasticizer having no (meth)acryloyl group.

16 Claims, No Drawings

US 11,560,475 B2

PHOTOCURABLE RESIN COMPOSITION, CURED PRODUCT, AND LAMINATE

BACKGROUND

1. Technical Field

The present invention relates to a photocurable resin composition, a cured product, and a laminate.

2. Description of Related Arts

In the related art, in the bonding of a liquid crystal display unit and a protective panel, a flexible photocurable resin composition has been used for the purpose of stress relaxation when large areas are bonded to each other and relaxation of the impact of the bonded laminates. For example, JP 2015-163699 A discloses a photocurable adhesive composition containing a polyisoprene (meth)acrylate oligomer, a polybutadiene (meth)acrylate oligomer, and the like as main components.

SUMMARY

The photocurable resin composition used for assembling industrial products has been required to have quick curability by irradiation with a low integrated light intensity from the viewpoint of productivity; however, the photocurable adhesive composition disclosed in JP 2015-163699 A has a problem in that the quick curability by irradiation with a low integrated light intensity is inferior. In the present invention, the irradiation with a low integrated light intensity means a range of 0.5 to 25.0 kJ/m$^2$.

The present invention has been made in view of the above circumstances, and is to provide a photocurable resin composition having excellent quick curability by irradiation with a low integrated light intensity and capable of obtaining a flexible cured product.

The gist of the present invention will be described below.

[1] A photocurable resin composition comprising the following components (A) to (E):
  component (A): a monofunctional urethane (meth)acrylate having a polyether skeleton;
  component (B): a monofunctional (meth)acrylic monomer having a polyether skeleton and having no urethane skeleton;
  component (C): a photoradical polymerization initiator;
  component (D): a polyfunctional (meth)acrylic monomer having 4 or more functionalities; and
  component (E): a polyester-based plasticizer having no (meth)acryloyl group.

[2] The photocurable resin composition according to [1], wherein a quick curability (G'2 (7.5 kJ/m$^2$)/G'1 (15.0 kJ/m$^2$)) by irradiation with a low integrated light intensity is in a range of 0.90 to 1.50.

[3] The photocurable resin composition according to [1] or [2], wherein the component (A) is contained at 20 to 90 parts by mass with respect to a total of 100 parts by mass of the component (A) and the component (B).

[4] The photocurable resin composition according to any one of [1] to [3], wherein the component (C) is contained at 0.1 to 15 parts by mass with respect to a total of 100 parts by mass of the component (A) and the component (B).

[5] The photocurable resin composition according to any one of [1] to [4], wherein the component (D) is contained at 0.1 to 15 parts by mass with respect to a total of 100 parts by mass of the component (A) and the component (B).

[6] The photocurable resin composition according to any one of [1] to [5], wherein the component (E) is contained at 30 to 200 parts by mass with respect to a total of 100 parts by mass of the component (A) and the component (B).

[7] The photocurable resin composition according to any one of [1] to [6], wherein the number of repetitions of an alkylene oxide moiety of the component (E) is 3 to 300.

[8] The photocurable resin composition according to any one of [1] to [7], wherein a viscosity of the composition at 25° C. is 0.01 to 15 Pa·s.

[9] The photocurable resin composition according to any one of [1] to [8], wherein a storage elastic modulus (G'2) of a cured product obtained by irradiating with ultraviolet rays of 7.5 kJ/m$^2$ is 100 to 2000 Pa.

[10] The photocurable resin composition according to any one of [1] to [9], wherein the composition does not include a bifunctional (meth)acrylate.

[11] The photocurable resin composition according to any one of [1] to [11], wherein a weight average molecular weight of the component (A) is 1,000 to 300,000.

[12] The photocurable resin composition according to any one of [1] to [11], wherein the component (A) is contained at 25 to 80 parts by mass with respect to a total of 100 parts by mass of the component (A) and the component (B).

[13] The photocurable resin composition according to any one of [1] to [12], wherein the component (B) is at least one selected from the group consisting of methoxydiethylene glycol mono(meth)acrylate, methoxytriethylene glycol mono(meth)acrylate, methoxytetraethylene glycol mono(meth)acrylate, methoxypentaethylene glycol mono(meth)acrylate, methoxyhexaethylene glycol mono(meth)acrylate, methoxyheptaethylene glycol mono(meth)acrylate, methoxyhectaethylene glycol mono(meth)acrylate, ethoxyoctaethylene glycol mono(meth)acrylate, methoxynonaethylene glycol mono(meth)acrylate, methoxydecaethylene glycol mono(meth)acrylate, methoxytripropylene glycol mono(meth)acrylate, methoxytetrapropylene glycol mono(meth)acrylate, methoxypentapropylene glycol mono(meth)acrylate, methoxyhexapropylene glycol mono(meth)acrylate, methoxyheptapropylene glycol mono(meth)acrylate, methoxyheptapropylene glycol mono(meth)acrylate, methoxyoctapropylene glycol mono(meth)acrylate, methoxynonapropylene glycol mono(meth)acrylate, methoxydecapropylene glycol mono(meth)acrylate, methoxytributylene glycol mono(meth)acrylate, methoxytetrabutylene glycol mono(meth)acrylate, methoxypentabutylene glycol mono(meth)acrylate, methoxyhexabutylene glycol mono(meth)acrylate, methoxyheptabutylene glycol mono(meth)acrylate, methoxyhectabutylene glycol mono(meth)acrylate, methoxyoctabutylene glycol mono(meth)acrylate, methoxynonabutylene glycol mono(meth)acrylate, methoxydecabutylene glycol mono(meth)acrylate, ethoxydiethylene glycol mono(meth)acrylate, ethoxytriethylene glycol mono(meth)acrylate, ethoxytetraethylene glycol mono(meth)acrylate, ethoxypentaethylene glycol mono(meth)acrylate, ethoxyhexaethylene glycol mono(meth)acrylate, ethoxyheptaethylene glycol mono(meth)acrylate, ethoxyhectaethylene glycol mono(meth)acrylate, ethoxyoctaethylene glycol mono(meth)acrylate, ethoxynonaethylene glycol mono(meth)acrylate, ethoxydecaethylene glycol mono(meth)acrylate, ethoxytripropylene glycol mono(meth)acrylate, ethoxytetrapropylene glycol mono(meth)acrylate, ethoxypentapropylene glycol mono(meth)acrylate, ethoxyhexapropylene glycol mono(meth)acrylate, ethoxyheptapropylene glycol mono(meth)acrylate, ethoxyheptapropylene glycol mono(meth)acrylate, ethoxyoctapropylene glycol mono(meth)acrylate, ethoxynonapropylene glycol mono(meth)acrylate, ethoxydecapropylene glycol mono(meth)acrylate, ethoxytributylene glycol mono(meth)acrylate, ethoxytetrabutylene glycol mono(meth)acrylate, ethoxypentabutylene glycol mono(meth)acrylate, ethoxyhexabutylene glycol mono(meth)acrylate, ethoxyheptabutylene glycol mono(meth)acrylate, ethoxyhectabutylene glycol mono(meth)acrylate, ethoxyoctabutylene glycol mono(meth)acrylate, ethoxynonabutylene glycol mono(meth)acrylate and ethoxydecabutylene glycol mono(meth)acrylate.

[14] The photocurable resin composition according to any one of [1] to [13], wherein the component (D) is at least one selected from the group consisting of ditrimethylolpropane tetra(meth)acrylate, pentaerythritol tetra(meth)acrylate, dipentaerythritol monohydroxypenta (meth)acrylate, alkyl-modified dipentaerythritol penta (meth)acrylate and dipentaerythritol hexa (meth)acrylate.

[15] A cured product obtained by curing the photocurable resin composition according to any one of [1] to [14].

[16] A laminate obtained by laminating with the photocurable resin composition according to any one of [1] to [14].

DETAILED DESCRIPTION

The details of the invention are described below. In addition, in this specification, "X to Y" is used in the meaning that the numerical values (X and Y) described before and after it are included as the lower limit value and the upper limit value, and means "X or more and Y or less". Further, in the present invention, (meth)acrylate means both acrylate and methacrylate.

One embodiment of the present invention is a photocurable resin composition containing the following components (A) to (E):

component (A): a monofunctional urethane (meth)acrylate having a polyether skeleton;

component (B): a monofunctional (meth)acrylic monomer having a polyether skeleton and having no urethane skeleton;

component (C): a photoradical polymerization initiator;

component (D): a polyfunctional (meth)acrylic monomer having 4 or more functionalities; and component (E): a polyester-based plasticizer having no (meth)acryloyl group.

With such a configuration, there is provided a photocurable resin composition having excellent quick curability by irradiation with a low integrated light intensity and capable of obtaining a flexible cured product.

<Component (A)>

It is not particularly limited as long as the monofunctional urethane (meth)acrylate having a polyether skeleton of the component (A) contained in the photocurable resin composition of the present invention, and by combining with other components of the present invention, it can be rapidly cured by irradiation with a low integrated light intensity, and thereby a cured product having low elasticity can be obtained. The urethane (meth)acrylate is a compound having a urethane bond obtained by reacting an isocyanate group and a hydroxy group, and a (meth)acryloyl group. The polyether skeleton means a skeleton having an alkylene oxide such as polyethylene oxide, polypropylene oxide, and polybutylene glycol.

A method for producing the component (A) is not particularly limited, and examples thereof include urethane (meth)acrylate consisting of a reaction product of a polyol compound having a hydroxyl group and (meth)acrylate having an isocyanate group; urethane (meth)acrylate consisting of a reaction product of a polyol compound having a hydroxyl group, a polyisocyanate compound, and a (meth)acrylate having a hydroxyl group; and the like. The polyol compound having a hydroxyl group is, for example, polyethylene oxide, polypropylene oxide, polybutylene glycol, and the like, and the number of repetitions of the alkylene oxide is not particularly limited, and is, for example, 3 to 500, more preferably 5 to 100, and particularly preferably 10 to 50. Examples of the (meth)acrylate having an isocyanate group include 2-isocyanatoethyl (meth)acrylate, 2-(2-(meth)acryloyloxyethyloxy) ethyl isocyanate, and the like. The polyisocyanate compound is not particularly limited, and examples thereof include aromatic polyisocyanate, alicyclic polyisocyanate, aliphatic polyisocyanate, and the like. Among these, aliphatic polyisocyanate and alicyclic polyisocyanate are preferable from the viewpoint of obtaining a flexible cured product. These may be used alone or in combination of two or more types thereof.

Examples of the aromatic polyisocyanate include 2,4-tolylene diisocyanate, 2,6-tolylene diisocyanate, 1,3-xylylene diisocyanate, 1,4-xylylene diisocyanate, tetramethylxylylene diisocyanate, diphenylmethane diisocyanate, naphthalene-1,5-disocyanate, triphenylmethane triisocyanate, and the like, examples of the alicyclic polyisocyanate include isophorone diisocyanate, bis(4-isocyanatocyclohexyl) methane, 1,3-bis(isocyanatomethyl) cyclohexane, 1,4-bis(isocyanatomethyl) cyclohexane, norbornane diisocyanate, bicycloheptane triisocyanate, and the like, and examples of the aliphatic polyisocyanate include hexamethylene diisocyanate, 1,3,6-hexamethylene triisocyanate, 1,6,11-undecatriisocyanate, and the like. Examples of the (meth)acrylate containing a hydroxyl group include 2-hydroxyethyl (meth)acrylate, 2-hydroxypropyl (meth)acrylate, 2-hydroxybutyl (meth)acrylate, 4-hydroxycyclohexyl (meth)acrylate, 1,6-hexanediol mono(meth)acrylate, neopentyl glycol mono(meth)acrylate, (poly)ethylene glycol mono(meth)acrylate, (poly) propylene glycol mono(meth)acrylate, pentaerythritol tri(meth)acrylate, and the like. Among these, 2-hydroxyethyl (meth)acrylate, 2-hydroxypropyl (meth)acrylate, 2-hydroxybutyl (meth)acrylate, and 4-hydroxycyclohexyl (meth)acrylate are preferable from the viewpoint of obtaining a cured product having excellent flexibility. These may be used alone or in combination of two or more types thereof.

Further, examples of a catalyst used when synthesizing the component (A) include lead oleate, antimony trichloride, triphenylaluminum, trioctylaluminum, tetrabutyltin, dibutyltin dilaurate, copper naphthenate, zinc naphthenate, zinc octylate, zinc octate, zirconium naphthenate, cobalt naphthenate, tetra-n-butyl-1,3-diacetyloxydistanoxane, triethylamine, 1,4-diaza [2,2,2] bicyclooctane, N-ethylmorpholine, and the like. Among these, dibutyltin dilaurate, zinc naphthenate, zinc octylate, and zinc octate are preferably used from the viewpoint that those are rapidly cured by irradiation with a low integrated light intensity, and thereby a cured product having low elasticity can be obtained. It is preferable to use 0.0001 to 10 parts by mass of these catalysts with respect to 100 parts by mass of the total amount of the reactants. A reaction temperature is usually 10° C. to 100° C., and particularly preferably 30° C. to 90° C.

A weight average molecular weight of the component (A) in the present invention is not particularly limited, and for example, the weight average molecular weight is preferably 1,000 to 300,000, more preferably 3,000 to 50,000, and particularly preferably 5,000 to 40,000, from the viewpoint of excellent quick curability by irradiation with a low integrated light intensity and capable of obtaining a flexible cured product. Unless otherwise specified, the weight average molecular weight is calculated by a standard polystyrene conversion method using size exclusion chromatography (SEC).

The commercially available product of the component (A) is not particularly limited, and can be obtained from, for example, Rahn AG, Negami chemical industrial co., ltd and the like. Specifically, GENOMER4188, 4312, 4316, 4590 (available from Rahn AG) and the like can be exemplified.

The amount of the component (A) is preferably in a range of 20 to 90 parts by mass, more preferably 25 to 80 parts by mass, still more preferably 30 to 75 parts by mass, and particularly preferably 40 to 70 parts by mass, with respect to 100 parts by mass of the total of the component (A) and the component (B). Further, the component (A) may be 35 to 65 parts by mass with respect to a total of 100 parts by mass of the component (A) and the component (B). Within the above range, it is possible to obtain a photocurable resin composition having excellent quick curability by irradiation with a low integrated light intensity and capable of obtaining a flexible cured product.

<Component (B)>

It is not particularly limited as long as it is a monofunctional (meth)acrylic monomer having a polyether skeleton and having no urethane skeleton, which is the component (B) contained in the photocurable resin composition of the present invention, and by combining with the other components of the present invention, it is possible to be excellent quick curability by irradiation with a low integrated light intensity and obtain a flexible cured product. The polyether skeleton means a skeleton having an alkylene oxide such as polyethylene oxide, polypropylene oxide, and polybutylene glycol. The number of repetitions of the alkylene oxide moiety is not particularly limited, and is, for example, 2 to 300.

The component (B) is not particularly limited, and examples thereof include methoxydiethylene glycol mono(meth)acrylate, methoxytriethylene glycol mono(meth)acrylate, methoxytetraethylene glycol mono(meth)acrylate, methoxypentaethylene glycol mono(meth)acrylate, methoxyhexaethylene glycol mono(meth)acrylate, methoxyheptaethylene glycol mono(meth)acrylate, methoxyhectaethylene glycol mono(meth)acrylate, ethoxyoctaethylene glycol mono(meth)acrylate, methoxynonaethylene glycol mono(meth)acrylate, methoxydecaethylene glycol mono(meth)acrylate, methoxytripropylene glycol mono(meth)acrylate, methoxytetrapropylene glycol mono(meth)acrylate, methoxypentapropylene glycol mono(meth)acrylate, methoxyhexapropylene glycol mono(meth)acrylate, methoxyheptapropylene glycol mono(meth)acrylate, methoxyheptapropylene glycol mono(meth)acrylate, methoxyoctapropylene glycol mono(meth)acrylate, methoxynonapropylene glycol mono(meth)acrylate, methoxydecapropylene glycol mono(meth)acrylate, methoxytributylene glycol mono(meth)acrylate, methoxytetrabutylene glycol mono(meth)acrylate, methoxypentabutylene glycol mono(meth)acrylate, methoxyhexabutylene glycol mono(meth)acrylate, methoxyheptabutylene glycol mono(meth)acrylate, methoxyhectabutylene glycol mono(meth)acrylate, methoxyoctabutylene glycol mono(meth)acrylate, methoxynonabutylene glycol mono(meth)acrylate, methoxydecabutylene glycol mono(meth)acrylate, ethoxydiethylene glycol mono(meth)acrylate, ethoxytriethylene glycol mono(meth)acrylate, ethoxytetraethylene glycol mono(meth)acrylate, ethoxypentaethylene glycol mono(meth)acrylate, ethoxyhexaethylene glycol mono(meth)acrylate, ethoxyheptaethylene glycol mono(meth)acrylate, ethoxyhectaethylene glycol mono(meth)acrylate, ethoxyoctaethylene glycol mono(meth)acrylate, ethoxynonaethylene glycol mono(meth)acrylate, ethoxydecaethylene glycol mono(meth)acrylate, ethoxytripropylene glycol mono(meth)acrylate, ethoxytetrapropylene glycol mono(meth)acrylate, ethoxypentapropylene glycol mono(meth)acrylate, ethoxyhexapropylene glycol mono(meth)acrylate, ethoxyheptapropylene glycol mono(meth)acrylate, ethoxyheptapropylene glycol mono(meth)acrylate, ethoxyoctapropylene glycol mono(meth)acrylate, ethoxynonapropylene glycol mono(meth)acrylate, ethoxydecapropylene glycol mono(meth)acrylate, ethoxytributylene glycol mono(meth)acrylate, ethoxytetrabutylene glycol mono(meth)acrylate, ethoxypentabutylene glycol mono(meth)acrylate, ethoxyhexabutylene glycol mono(meth)acrylate, ethoxyheptabutylene glycol mono(meth)acrylate, ethoxyhectabutylene glycol mono(meth)acrylate, ethoxyoctabutylene glycol mono(meth)acrylate, ethoxynonabutylene glycol mono(meth)acrylate, ethoxydecabutylene glycol mono(meth)acrylate, and the like.

<Component (C)>

The photoradical polymerization initiator which is the component (C) contained in the photocurable resin composition of the present invention is not particularly limited as long as it is a compound that generates radical types by ultraviolet rays or the like. Examples of the photoradical polymerization initiator include an acetophenone-based photoradical polymerization initiator, a benzoin-based photoradical polymerization initiator, a benzophenone-based photoradical polymerization initiator, a thioxanthone-based photoradical polymerization initiator, an acylphosphine oxide-based photoradical polymerization initiator, a titanocene-based photoradical polymerization initiators, and the like. Among these, from the viewpoint of having more excellent quick curability by irradiation with a low integrated light intensity, acetphenone-based photoradical polymerization initiators and acylphosphine oxide-based photoradical polymerization initiators are preferable.

Examples of the acetophenone-based photoradical polymerization initiator, but are not limited to, include diethoxyacetophenone, 2-hydroxy-2-methyl-1-phenyl-propan-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl) butanone, 2-hydroxy-2-methyl-1-[4-(1-methylvinyl)phenyl] propanone oligomer, and the like. Commercially available products of the acetophenone-based photoradical polymerization initiator include IRGACURE184, IRGACUR1173, IRGACURE2959, IRGACURE127 (available from BASF), and ESACURE KIP-150 (available from Lamberti s.p.a.).

Examples of the acylphosphine oxide-based photoradical polymerization initiator, but are not limited to, include bis(2,4,6-trimethylbenzoyl)-phenyl-phosphine oxide, 2,4,6-trimethylbenzoyl-diphenyl-phosphine oxide, and the like. Examples of commercially available products of the acylphosphine oxide-based photoradical polymerization initiator include IRGACURE TPO, IRGACURE819, and IRGACURE819DW (available from BASF).

The amount of the component (C) is preferably in a range of 0.1 to 15 parts by mass, more preferably 0.3 to 7 parts by mass, and particularly preferably 0.5 to 5 parts by mass, with respect to 100 parts by mass of the total of the component (A) and the component (B). Further, the component (C) may be in the range of 0.4 to 1.6 parts by mass with respect to a total of 100 parts by mass of the component (A) and the component (B). Within the above range, it is possible to obtain a photocurable resin composition having excellent quick curability by irradiation with a low integrated light intensity and capable of obtaining a flexible cured product.

<Component (D)>

It is not particularly limited as long as it is a polyfunctional (meth)acrylic monomer having 4 or more functionalities, which is a component (D) contained in the photocurable resin composition of the present invention. By combining the component (D) with the other components of the present invention, it can be rapidly cured by irradiation with a low integrated light intensity, and thereby a cured product having low elasticity can be obtained. The component (D) is preferably pentafunctional or higher from the viewpoint that it is more excellent in the quick curability by irradiation with a low integrated light intensity.

Examples of the component (D), but are particularly not limited to, include ditrimethylolpropane tetra(meth)acrylate, pentaerythritol tetra(meth)acrylate, dipentaerythritol monohydroxypenta (meth)acrylate, alkyl-modified dipentaerythritol penta (meth)acrylate, dipentaerythritol hexa (meth) acrylate, and the like. These polymerizable monomers can be used alone or as a mixture of two or more types thereof.

The amount of the component (D) is preferably in a range of 0.1 to 15 parts by mass, more preferably 0.2 to 5 parts by mass, and particularly preferably 0.3 to 3 parts by mass, with respect to 100 parts by mass of the total of the component (A) and the component (B). Within the above range, it is possible to obtain a photocurable resin composition further having excellent quick curability by irradiation with a low integrated light intensity and capable of obtaining a flexible cured product.

<Component (E)>

It is not particularly limited as long as it is a polyester-based plasticizer having no (meth)acryloyl group, which is a component (E) contained in the photocurable resin composition of the present invention, and by combining with the other components of the present invention, it is possible to obtain a photocurable resin composition having excellent quick curability by irradiation with a low integrated light intensity and capable of obtaining a flexible cured product.

The polyether skeleton means a skeleton having an alkylene oxide such as polyethylene oxide, polypropylene oxide, and polybutylene glycol. The number of repetitions of the alkylene oxide is not particularly limited, and is, for example, 3 to 300, more preferably to 100, and particularly preferably 10 to 60. A number average molecular weight of the component (E) is not particularly limited, and is, for example, in the range of 200 to 30,000, preferably in the range of 350 to 10000, and particularly preferably in the range of 500 to 5000. Unless otherwise specified, the number average molecular weight is calculated by a standard polystyrene conversion method using size exclusion chromatography (SEC). Within the above range, it is possible to obtain a photocurable resin composition further having excellent quick curability by irradiation with a low integrated light intensity and capable of obtaining a flexible cured product.

The commercially available product of the component (E) is not particularly limited, and examples thereof include PEG #300, PEG #400, PEG #600, PEG #1000, PEG #1500, PEG #15400, PEG #2000, PEG #4000, PEG #6000, PEG #1100, PEG #2000, UNIOR D-700, D-1000, D1200, D2000, D4000, PB-500, PB-700, PB-1000, PB-2000 (available from NOF CORPORATION), and the like.

The amount of the component (E) added is not particularly limited, and for example, the component (E) is 30 to 200 parts by mass, more preferably 35 to 150 parts by mass, and particularly preferably 40 to 100 parts by mass, with respect to a total of 100 parts by mass of the component (A) and the component (B). Within the above range, it is possible to obtain a photocurable resin composition further having excellent quick curability by irradiation with a low integrated light intensity and capable of obtaining a flexible cured product.

<Optional Components>

With respect to the photocurable resin composition of the present invention, as long as the object of the present invention is not impaired, various elastomers such as a styrene-based copolymer, and additives such as an organic peroxide, polythiol, a silane coupling agent, an inorganic filler, an organic filler, a storage stabilizer, an antioxidant, a light stabilizer, a rust inhibitor, a solvent, a pigment, a dye, a flame retardant, a tack fire and a surfactant can be used.

The photocurable resin composition of the present invention preferably does not contain bifunctional (meth)acrylate from the viewpoint that a flexible and low-elasticity cured product can be obtained. Examples of the bifunctional (meth)acrylate include 1,9-nonanediol di(meth)acrylate, glycerin di(meth)acrylate, neopentyl glycol di(meth)acrylate, dicyclopentenyl diacrylate, and the like. If the bifunctional (meth)acrylate is contained, it is contained in an amount of less than 30% by weight, more preferably less than 1% by weight, and still more preferably less than 0.1% by weight, with respect to the total amount of all the components of the photocurable resin composition. Particularly preferably, the photocurable resin composition of the present invention does not contain bifunctional (meth)acrylate. In the present invention, trifunctional (meth)acrylate can be contained as long as the object of the present invention is not impaired. In one embodiment, the photocurable resin composition of the present invention does not contain trifunctional (meth)acrylate.

The inorganic filler is not particularly limited, and examples thereof include glass, fumed silica, alumina, talc, mica, ceramics, silicone rubber powder, calcium carbonate, aluminum hydroxide, aluminum nitride, carbon powder, kaolin clay, dried clay minerals, dried diatomaceous earth, and the like. Among them, glass, fumed silica, talc, mica, and the like can be included.

The fumed silica can be blended for the purpose of adjusting the viscosity of the photocurable resin composition or improving the mechanical strength of the cured product. Preferably, those hydrophobized with organochlorosilane, polyorganosiloxane, hexamethyldisilazane, and the like can be used, for example. Specific examples of the silica include commercially available products such as AEROSIL R974, R972, R972V, R972CF, R805, R812, R812S, R816, R8200, RY200, RX200, RY200S, and R202 available from Nippon Aerosil. These may be used alone or in combination of two or more types thereof.

Examples of the organic filler include polyethylene, polypropylene, nylon, crosslinked acrylic, crosslinked polystyrene, polyester, polyvinyl alcohol, polyvinylbutyral, and polycarbonate. In addition, an organic hollow filler such as an MMA-AN-MAN copolymer, for example, can also be included.

The amount of the filler added is not particularly limited, and for example, it is 0.01 to 500 parts by mass, more preferably 0.1 to 300 parts by mass, and particularly preferably 0.5 to 150 parts by mass, with respect to a total of 100 parts by mass of the component (A) and the component (B). These may be used alone or in combination of two or more types thereof.

<Production Method>

The photocurable resin composition of the present invention can be produced by a known method in the related art. For example, a predetermined amount of the components (A) to (E) and other optional components are blended, and it can be produced by using a mixing means such as a mixer such as a planetary mixer preferably at a temperature of 10° C. to 70° C., more preferably at 20° C. to 50° C., particularly preferably at room temperature (25° C.), and preferably for 0.1 to 5 hours, more preferably for 30 minutes to 3 hours, and particularly preferably for about 60 minutes.

<Curing Method>

The photocurable resin composition of the present invention can be cured by irradiating with light such as ultraviolet rays, visible light, and active energy rays. Light herein means the light in a broad sense including various active energy rays such as radiation such as α-rays and β-rays, electromagnetic waves such as γ-rays and X-rays, electron beams (EB), ultraviolet rays of about 100 to 400 nm, and visible rays of about 400 to 800 nm. The light source for curing is not particularly limited, and examples thereof include a low pressure mercury lamp, a medium pressure mercury lamp, a high pressure mercury lamp, an ultra high pressure mercury lamp, a black light lamp, a microwave-excited mercury lamp, a metal halide lamp, a sodium lamp, a halogen lamp, a xenon lamp, LED, a fluorescent lamp, sunlight, an electron beam irradiation device, and the like. From the viewpoint of the properties of the cured product, the amount of irradiation with a low integrated light intensity is, for example, 7.5 kJ/m$^2$ or more, and preferably at least 10 kJ/m$^2$.

<Cured Product>

A cured product obtained by irradiating the photocurable resin composition of the present invention with light is also an aspect of the present invention. Further, the cured product more preferably satisfies the following characteristic value (1) or (2), and particularly preferably satisfies both the characteristic value of (1) and the characteristic value of (2).

<(1) Storage Elastic Modulus of Cured Product by Irradiation with a Low Integrated Light Intensity>

Each photocurable resin composition is set on a stage of a rheometer (MARS3 available from Thermo Fisher Scientific Co., Ltd.) capable of UV irradiation, and the elastic modulus (G'2) at the time of irradiation with an integrated light intensity of 7.5 kJ/m$^2$ is measured under the following conditions. The elastic modulus (G'2) is preferably 100 to 2000 Pa, more preferably 150 to 1700 Pa, and particularly preferably 200 to 1400 Pa from the viewpoint of being a flexible and low-elasticity cured product in the present invention.

<Measurement Conditions of Rheometer>
Geometry: P25
Gap: 1.0 mm
Frequency: 1 Hz
Measurement temperature: 25° C.

<(2) Quick Curability by Irradiation with a Low Integrated Light Intensity>

Each photocurable resin composition is set on a stage of a rheometer (MARS3 available from Thermo Fisher Scientific Co., Ltd.) capable of UV irradiation, and the storage elastic modulus when the photocurable resin composition is continuously irradiated with ultraviolet rays is measured in a timely manner under the following conditions. The storage elastic modulus at the time of irradiation with an integrated light intensity of 7.5 kJ/m$^2$ was set as G'2, the storage elastic modulus at the time of irradiation with an integrated light intensity of 15.0 kJ/m$^2$ is set as G'2, and then a value of G'2/G'1 (quick curability by irradiation with a low integrated light intensity) is calculated. In the present invention, G'2/G'1 is preferably in the range of 0.90 to 1.50, more preferably 0.95 to 1.45, and particularly preferably 0.97 to 1.40 from the viewpoint of the excellent quick curability by irradiation with a low integrated light intensity.

<Measurement Conditions of Rheometer>
Geometry: P25
Gap: 1.0 mm
Frequency: 1 Hz
Measurement temperature: 25° C.

<Applying Method>

As a method for applying the photocurable resin composition of the present invention to a substrate, a known method for applying an adhesive or a paint is used. For example, methods such as dispensing, spraying, ink jet printing, screen printing, gravure printing, dipping, and spin coating using an automatic coating machine can be used.

<(3) Measurement of Viscosity>

The viscosity (Pa·s) of the photocurable resin composition was measured with a cone plate type viscometer (available from Brookfield) based on the following measurement conditions. In the present invention, the viscosity of the photocurable resin composition is preferably 0.01 to 15 Pa·s, more preferably 0.03 to 10 Pa·s, and particularly preferably 0.05 to 5 Pa·s from the viewpoint of applying workability.

[Measurement Conditions]
Cone type
Shear velocity: 38S$^{-1}$
Temperature: 25° C.

<Use Application>

The photocurable resin composition of the present invention can be used in various fields such as an automobile field, an electric/electronic component field, and an aerospace field, and among these, from the viewpoint of having excellent quick curability by irradiation with a low integrated light intensity and capable of obtaining a flexible cured product, particularly preferable uses are a resin for bonding a liquid crystal display unit and a protective panel; an elastic curable resin for adjusting a surface pressure applied in a stacking direction between cells when a fuel cell and a sensor are sealed, and cells of a secondary battery are stacked (refer to JP 2009-158381 A); and the like. Note that, a laminate laminated using the photocurable resin composition of the present invention is also an aspect of the present invention. That is, one embodiment of the present invention is a laminate in which a first adherend, the cured product obtained by curing the photocurable resin composition of the present invention, and a second adherend are laminated in this order. For example, when the photocurable resin composition of the present invention is used as a bonding resin, the first adherend is a liquid crystal display unit, and the second adherend is a protective panel.

EXAMPLES

Hereinafter, the present invention will be described in more detail with reference to examples, but the present invention is not limited to these examples.

Preparation of Photocurable Resin Composition

Each component was sampled by parts by mass indicated in Table 1 and mixed with a mixer at room temperature (25°

C.) for 60 minutes under shading to obtain a photocurable resin composition. In addition, the detailed addition amount shall be in accordance with Table 1, and all numerical values shall be expressed in parts by mass.

<Component (A)> a1: Single-ended polyether urethane acrylate with a weight average molecular weight of 20,000 (available from Negami Chemical Industrial. Co., Ltd.)

Comparative Component of Component (A)

a'1: Double-ended polyether urethane acrylate with a weight average molecular weight of 41,000 (SHIKOH UV-3700B available from Mitsubishi Chemical Corporation)

<Component (B)> b1: Ethoxydiethylene glycol monoacrylate (Miramer M170 available from Toyo Chemicals Co., Ltd.)

b2: Methoxynona ethylene glycol monoacrylate (AM-90G available from Shin Nakamura Chemical Industry Co., Ltd.)

Comparative Component of Component (B)

b'1: Isobornyl acrylate (IBXA available from OSAKA ORGANIC CHEMICAL INDUSTRY LTD)

b'2: 2-hydroxyethyl methacrylate (Acrylic Ester HO available from MITSUBISHI RAYON CO., LTD.)

<Component (C)> c1: 2-hydroxy-2-methyl-1-phenyl-propan-1-one (DOUBLE CURE 173 available from DOUBLE BOND CHEMICAL IND. CO., LTD.)

<Component (D)> d1: Dipentaerythritol hexaacrylate (DPHA available from DAICEL-ALLNEX LTD.)

d2: Ditrimethylolpropane tetraacrylate (AD-TMP available from Shin Nakamura Chemical Industry Co., Ltd.)

Comparative Component of Component (D)

d'1: Isocyanuric acid EO-modified di and triacrylate (M-313 available from TOAGOSEI CO., LTD.)

<Component (E)> e1: Polypropylene glycol having a number average molecular weight of 2000 and an alkylene oxide repetition rate of 34 (UNIOR D2000 available from NOF CORPORATION)

Comparative Component of Component (E)

e'1: Polyether-based bifunctional acrylate (14EGA available from KYOEISHA CHEMICAL CO., LTD.)

e'2: Acrylic polymer plasticizer (UP1000 available from TOAGOSEI CO., LTD.)

Preparation of Comparative Example 10

13 parts by mass of polyisoprene (UC203M) having a methacryloyl group, 57 parts by mass of polyisoprene-based plasticizer, 30 parts by mass of phenoxyethyl acrylate, and 3 parts by mass of double cure 173 were added and mixed with a mixer at room temperature (25° C.) for 60 minutes under light shielding to obtain Comparative Example 10 as a photocurable resin composition.

The test methods of the tests (1) to (3) used in the examples and comparative examples in Table 1 are as follows.

<(1) Storage Elastic Modulus of Cured Product by Irradiation with a Low Integrated Light Intensity>

Each photocurable resin composition was set on a stage of a rheometer (MARS3 available from Thermo Fisher Scientific Co., Ltd.) capable of UV irradiation, and the storage elastic modulus (G'2) at the time of irradiation with an integrated light intensity of 7.5 kJ/m$^2$ was measured under the following conditions. The results are indicated in Table 1. The storage elastic modulus (G'2) is preferably 100 to 2000 Pa, more preferably 150 to 1700 Pa, and particularly preferably 200 to 1400 Pa from the viewpoint of being a flexible and low-elasticity cured product in the present invention.

<Measurement Conditions of Rheometer>

Geometry: P25
Gap: 1.0 mm
Frequency: 1 Hz
Measurement temperature: 25° C.

<(2) Quick Curability by Irradiation with a Low Integrated Light Intensity>

Each photocurable resin composition was set on a stage of a rheometer (MARS3 available from Thermo Fisher Scientific Co., Ltd.) capable of UV irradiation, and the storage elastic modulus when the photocurable resin composition was continuously irradiated with ultraviolet rays was measured in a timely manner under the following conditions. The storage elastic modulus at the time of irradiation with an integrated light intensity of 7.5 kJ/m$^2$ was set as G'2, the storage elastic modulus at the time of irradiation with an integrated light intensity of 15.0 kJ/m$^2$ is set as G'1, and then a value of G'2/G'1 (quick curability by irradiation with a low integrated light intensity) is calculated. In the present invention, G'2/G'1 is preferably in the range of 0.90 to 1.50, more preferably 0.95 to 1.45, and particularly preferably 0.97 to 1.40 from the viewpoint of the excellent quick curability by irradiation with a low integrated light intensity.

<Measurement Conditions of Rheometer>

Geometry: P25
Gap: 1.0 mm
Frequency: 1 Hz
Measurement temperature: 25° C.

<(3) Measurement of Viscosity>

The viscosity (Pa·s) of the photocurable resin composition was measured with a cone plate type viscometer (available from Brookfield) based on the following measurement conditions. The results are indicated in Table 1. In the present invention, the viscosity is preferably 0.01 to 15 Pa·s, more preferably 0.03 to 10 Pa·s, and particularly preferably 0.05 to 5 Pa·s from the viewpoint of applying workability.

[Measurement Conditions]

Cone type
Shear velocity: 38S$^{-1}$
Temperature: 25° C.

TABLE 1

| | Example 1 | Example 2 | Example 3 | Example 4 | Example 5 | Example 6 | Example 7 | Comparative Example 1 |
|---|---|---|---|---|---|---|---|---|
| a1 | 65 | 65 | 65 | 50 | 35 | 65 | 65 | 65 |
| a'1 | | | | | | | | |

TABLE 1-continued

| | | | | | | | | |
|---|---|---|---|---|---|---|---|---|
| b1 | 35 | 35 | 35 | 50 | 65 | | 35 | 35 |
| b2 | | | | | | 35 | | |
| b'1 | | | | | | | | |
| b'2 | | | | | | | | |
| c1 | 3 | 3 | 3 | 3 | 3 | 3 | 3 | 3 |
| d1 | 0.4 | 0.7 | 1.6 | 0.7 | 0.7 | 0.7 | | 0.5 |
| d2 | | | | | | | 0.7 | |
| d'1 | | | | | | | | |
| e1 | 60 | 60 | 60 | 60 | 60 | 60 | 60 | 0 |
| e'1 | | | | | | | | |
| e'2 | | | | | | | | |
| (1) Storage elastic modulus Pa of cured product by irradiation with low integrated light intensity (G'2) | 401 | 609 | 895 | 279 | 346 | 1182 | 543 | 8676 |
| (2) Quick curability by irradiation with low integrated light intensity (G'2/G'1) | 1.37 | 1.14 | 0.97 | 1.02 | 1.20 | 0.97 | 1.23 | 0.82 |
| (3) Viscosity Pa · s | 1.7 | 1.9 | 1.8 | 0.6 | 0.2 | 4.1 | 1.9 | — |

| | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
| a1 | 65 | 65 | | 65 | 65 | 65 | 65 | 65 |
| a'1 | | | 65 | | | | | |
| b1 | 35 | 35 | 35 | | | 0 | 35 | 35 |
| b2 | | | | 35 | | | | |
| b'1 | | | | | 35 | | | |
| b'2 | | | | | | | | |
| c1 | 3 | 3 | 3 | 3 | 3 | 3 | 3 | 3 |
| d1 | 0.5 | 0.5 | 0.5 | 0.7 | 0.7 | 0.7 | | 0 |
| d2 | | | | | | | | |
| d'1 | | | | | | | 0.7 | |
| e1 | | | 44 | 60 | 60 | 60 | 60 | 60 |
| e'1 | 60 | | | | | | | |
| e'2 | | 60 | 60 | | | | | |
| (1) Storage elastic modulus Pa of cured product by irradiation with low integrated light intensity (G'2) | 25918 | 1 | 7675 | 3297 | 2 | 2027 | 279 | 61 |
| (2) Quick curability by irradiation with low integrated light intensity (G'2/G'1) | 0.85 | 1.31 | 0.98 | 0.94 | 0.40 | 1.02 | 1.52 | 1.64 |
| (3) Viscosity Pa · s | 0.7 | 2.4 | 2.3 | 4.0 | 3.2 | 15.9 | 2.0 | 1.9 |

TABLE 2

| | Comparative Example 10 |
|---|---|
| (1) Storage elastic modulus Pa of cured product by irradiation with low integrated light intensity (G'2) | 467 |
| (2) Quick curability by irradiation with low integrated light intensity (G'2/G'1) | 0.37 |

As indicated in Examples 1 to 7 in Table 1, it was confirmed that the present invention is a photocurable resin composition having excellent quick curability by irradiation with a low integrated light intensity and capable of obtaining a flexible cured product.

Comparative Example 1 in Table 1 is a photocurable resin composition that does not contain the component (E) of the present invention, but it can be seen that it is a hard cured product and is inferior in the quick curability by irradiation with a low integrated light intensity. Further, Comparative Example 2 is a photocurable resin composition using e'1 which is not the component (E) of the present invention, but it can be seen that it is a hard cured product and is inferior in the quick curability by irradiation with a low integrated light intensity. Further, Comparative Example 3 is a photocurable resin composition using e'2 which is not the component (E) of the present invention, but it was liquid at the irradiation with a low integrated light intensity. Further, Comparative Example 4 is a photocurable resin composition using a'1 which is not the component (A) of the present invention, but it can be seen that it is a hard cured product. Further, Comparative Example 5 is a photocurable resin composition using b'1 which is not the component (B) of the present invention, but it can be seen that it is a hard cured product. Further, Comparative Example 6 is a photocurable resin composition using b'2 which is not the component (B) of the present invention, but it was liquid in the irradiation with a low integrated light intensity. Further, Comparative Example 7 is a composition containing no component (B) of the present invention, but it can be seen that it is a hard cured product. Further, Comparative Example 8 is a photocurable resin composition using d'1 which is not the component (D) of the present invention, but it can be seen that it is inferior in the quick curability by irradiation with a low integrated light intensity. Further, Comparative Example 9 was a composition containing no component (D) of the present invention, it but was liquid in the irradiation with a low integrated light intensity. Further, although Comparative Example in Table 2 is a composition corresponding to the related art, it can be seen that it is inferior in the quick curability by irradiation with a low integrated light intensity.

Since the present invention is a photocurable resin composition having excellent quick curability by irradiation with a low integrated light intensity and capable of obtaining a flexible cured product, it can be used in various fields, which is industrially useful.

The present application is based on Japan patent Application No. 2020-081963 filed on May 7, 2020, and the disclosure of which is entirely incorporated herein by reference.

What is claimed is:

1. A photocurable resin composition comprising the following components (A) to (E):
    component (A): a monofunctional urethane (meth)acrylate having a polyether skeleton;
    component (B): a monofunctional (meth)acrylic monomer having a polyether skeleton and having no urethane skeleton;
    component (C): a photoradical polymerization initiator;
    component (D): a polyfunctional (meth)acrylic monomer having 4 or more functionalities; and
    component (E): a polyester-based plasticizer having no (meth)acryloyl group.

2. The photocurable resin composition according to claim 1, wherein a quick curability (G'2 (7.5 kJ/m$^2$)/G'1 (15.0 kJ/m$^2$)) by irradiation with a low integrated light intensity is in a range of 0.90 to 1.50.

3. The photocurable resin composition according to claim 1, wherein the component (A) is contained at 20 to 90 parts by mass with respect to a total of 100 parts by mass of the component (A) and the component (B).

4. The photocurable resin composition according to claim 1, wherein the component (C) is contained at 0.1 to 15 parts by mass with respect to a total of 100 parts by mass of the component (A) and the component (B).

5. The photocurable resin composition according to claim 1, wherein the component (D) is contained at 0.1 to 15 parts by mass with respect to a total of 100 parts by mass of the component (A) and the component (B).

6. The photocurable resin composition according to claim 1, wherein the component (E) is contained at 30 to 200 parts by mass with respect to a total of 100 parts by mass of the component (A) and the component (B).

7. The photocurable resin composition according to claim 1, wherein the number of repetitions of an alkylene oxide moiety of the component (E) is 3 to 300.

8. The photocurable resin composition according to claim 1, wherein a viscosity of the composition at 25° C. is 0.01 to 15 Pa·s.

9. The photocurable resin composition according to claim 1, wherein a storage elastic modulus (G'2) of a cured product obtained by irradiating with ultraviolet rays of 7.5 kJ/m$^2$ is 100 to 2000 Pa.

10. The photocurable resin composition according to claim 1, wherein the composition does not include a bifunctional (meth)acrylate.

11. The photocurable resin composition according to claim 1, wherein a weight average molecular weight of the component (A) is 1,000 to 300,000.

12. The photocurable resin composition according to claim 1, wherein the component (A) is contained at 25 to 80 parts by mass with respect to a total of 100 parts by mass of the component (A) and the component (B).

13. The photocurable resin composition according to claim 1, wherein the component (B) is at least one selected from the group consisting of methoxydiethylene glycol mono(meth)acrylate, methoxytriethylene glycol mono(meth)acrylate, methoxytetraethylene glycol mono(meth)acrylate, methoxypentaethylene glycol mono(meth)acrylate, methoxyhexaethylene glycol mono(meth)acrylate, methoxyheptaethylene glycol mono(meth)acrylate, methoxyhectaethylene glycol mono(meth)acrylate, ethoxyoctaethylene glycol mono(meth)acrylate, methoxynonaethylene glycol mono(meth)acrylate, methoxydecaethylene glycol mono(meth)acrylate, methoxytripropylene glycol mono(meth)acrylate, methoxytetrapropylene glycol mono(meth)acrylate, methoxypentapropylene glycol mono(meth)acrylate, methoxyhexapropylene glycol mono(meth)acrylate, methoxyheptapropylene glycol mono(meth)acrylate, methoxyheptapropylene glycol mono(meth)acrylate, methoxyoctapropylene glycol mono(meth)acrylate, methoxynonapropylene glycol mono(meth)acrylate, methoxydecapropylene glycol mono(meth)acrylate, methoxytributylene glycol mono(meth)acrylate, methoxytetrabutylene glycol mono(meth)acrylate, methoxypentabutylene glycol mono(meth)acrylate, methoxyhexabutylene glycol mono(meth)acrylate, methoxyheptabutylene glycol mono(meth)acrylate, methoxyhectabutylene glycol mono(meth)acrylate, methoxyoctabutylene glycol mono(meth)acrylate, methoxynonabutylene glycol mono(meth)acrylate, methoxydecabutylene glycol mono(meth)acrylate, ethoxydiethylene glycol mono(meth)acrylate, ethoxytriethylene glycol mono(meth)acrylate, ethoxytetraethylene glycol mono(meth)acrylate, ethoxypentaethylene glycol mono(meth)acrylate, ethoxyhexaethylene glycol mono(meth)acrylate, ethoxyheptaethylene glycol mono(meth)acrylate, ethoxyhectaethylene glycol mono(meth)acrylate, ethoxyoctaethylene glycol mono(meth)acrylate, ethoxynonaethylene glycol mono(meth)acrylate, ethoxydecaethylene glycol mono(meth)acrylate, ethoxytripropylene glycol mono(meth)acrylate, ethoxytetrapropylene glycol mono(meth)acrylate, ethoxypentapropylene glycol mono(meth)acrylate, ethoxyhexapropylene glycol mono(meth)acrylate, ethoxyheptapropylene glycol mono(meth)acrylate, ethoxyheptapropylene glycol mono(meth)acrylate, ethoxyoctapropylene glycol mono(meth)acrylate, ethoxynonapropylene glycol mono(meth)acrylate, ethoxydecapropylene glycol mono(meth)acrylate, ethoxytributylene glycol mono(meth)acrylate, ethoxytetrabutylene glycol mono(meth)acrylate, ethoxypentabutylene glycol mono(meth)acrylate, ethoxyhexabutylene glycol mono(meth)acrylate, ethoxyheptabutylene glycol mono(meth)acrylate, ethoxyhectabutylene glycol mono(meth)acrylate, ethoxyoctabutylene glycol mono(meth)acrylate, ethoxynonabutylene glycol mono(meth)acrylate and ethoxydecabutylene glycol mono(meth)acrylate.

14. The photocurable resin composition according to claim 1, wherein the component (D) is at least one selected from the group consisting of ditrimethylolpropane tetra(meth)acrylate, pentaerythritol tetra(meth)acrylate, dipentaerythritol monohydroxypenta (meth)acrylate, alkyl-modified dipentaerythritol penta (meth)acrylate and dipentaerythritol hexa (meth)acrylate.

15. A cured product obtained by curing the photocurable resin composition according to claim 1.

16. A laminate obtained by laminating with the photocurable resin composition according to claim 1.

* * * * *